US012713346B2

(12) United States Patent
Åström et al.

(10) Patent No.: US 12,713,346 B2
(45) Date of Patent: Aug. 18, 2026

(54) POWER CONTROL BETWEEN INTEGRATED ACCESS AND BACKHAUL (IAB) NODES

(71) Applicant: Telefonaktiebolaget LM Ericsson (publ), Stockholm (SE)

(72) Inventors: Magnus Åström, Lund (SE); Boris Dortschy, Hägersten (SE); Yezi Huang, Täby (SE); Lei Bao, Gothenburg (SE); Behrooz Makki, Pixbo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 591 days.

(21) Appl. No.: 18/040,349

(22) PCT Filed: Aug. 6, 2021

(86) PCT No.: PCT/EP2021/072048
§ 371 (c)(1),
(2) Date: Feb. 2, 2023

(87) PCT Pub. No.: WO2022/029309
PCT Pub. Date: Feb. 10, 2022

(65) Prior Publication Data

US 2023/0362813 A1 Nov. 9, 2023

Related U.S. Application Data

(60) Provisional application No. 63/062,631, filed on Aug. 7, 2020.

(51) Int. Cl.
*H04W 52/02* (2009.01)
*H04W 52/26* (2009.01)
(Continued)

(52) U.S. Cl.
CPC ... *H04W 52/0219* (2013.01); *H04W 52/0216* (2013.01); *H04W 52/262* (2013.01); *H04W 52/367* (2013.01); *H04W 84/047* (2013.01)

(58) Field of Classification Search
CPC ..... H04W 52/14; H04W 88/14; H04W 88/08; H04W 52/08; H04W 52/46; H04W 8/08;
(Continued)

(56) References Cited

U.S. PATENT DOCUMENTS

2020/0053655 A1 2/2020 Ghosh et al.
2020/0107362 A1 4/2020 Qi et al.

FOREIGN PATENT DOCUMENTS

WO 2020060232 A1 3/2020
WO WO-2020060143 A1 * 3/2020 .......... H04W 84/047

OTHER PUBLICATIONS

International Search Report and Written Opinion dated Nov. 23, 2021 for International Application No. PCT/EP2021/072048 filed Aug. 6, 2021, consisting of 15-pages.

(Continued)

*Primary Examiner* — Tu X Nguyen
(74) *Attorney, Agent, or Firm* — Weisberg I.P. Law, P.A.

(57) ABSTRACT

A method, system and apparatus are disclosed for power control between integrated access and backhaul (IAB) nodes. In one embodiment, a first node is provided. The first node includes processing circuitry configured to transmit a power control request to a parent, integrated access and backhaul, IAB, node where the power control request is configured to request an adjustment of a transmission power of the parent IAB node, receive a power control response from the parent IAB node, and perform at least one action associated with a second node based at least in part on the power control response.

19 Claims, 8 Drawing Sheets

(51) Int. Cl.
*H04W 52/36* (2009.01)
*H04W 84/04* (2009.01)

(58) Field of Classification Search
CPC ..... H04W 84/18; H04W 92/24; H04W 92/22; H04W 92/04
See application file for complete search history.

(56) References Cited

OTHER PUBLICATIONS

3GPP TSG RAN WG1 Meeting #94 R1-1809072; Title: Enhancements to support NR backhaul links; Agenda Item: 7.2.3.1; Source: AT&T; Document for: Discussion/Approval; Date and Location: Aug. 20-24, 2018, Gothenburg, Sweden, consisting of 10-pages.

ETSI TS 138 175 V16.0.0; Technical Specification; 5G; NR; Integrated Access and Backhaul (IAB) Electromagnetic Compatibility (EMC) (3GPP TS 38.175 version 16.0.0 Release 16); Nov. 2020, consisting of 24-pages.

3GPP TR 38.874 V16.0.0; 3rd Generation Partnership Project; Technical Specification Group Radio Access Network; NR; Study on Integrated Access and Backhaul; (Release 16); Dec. 2018, consisting of 111-pages.

* cited by examiner

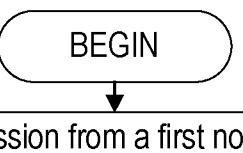

Receive a first transmission from a first node where at least one parameter of the first transmission has been adjusted based at least in part on whether a transmission power of the parent, integrated access and backhaul, IAB, node was adjusted in response to a power control request
S154

Cause transmission of a power control response to the first node where the power control response indicates whether the transmission power of the parent IAB node is being adjusted
S156

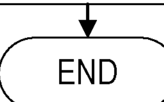

FIG. 12

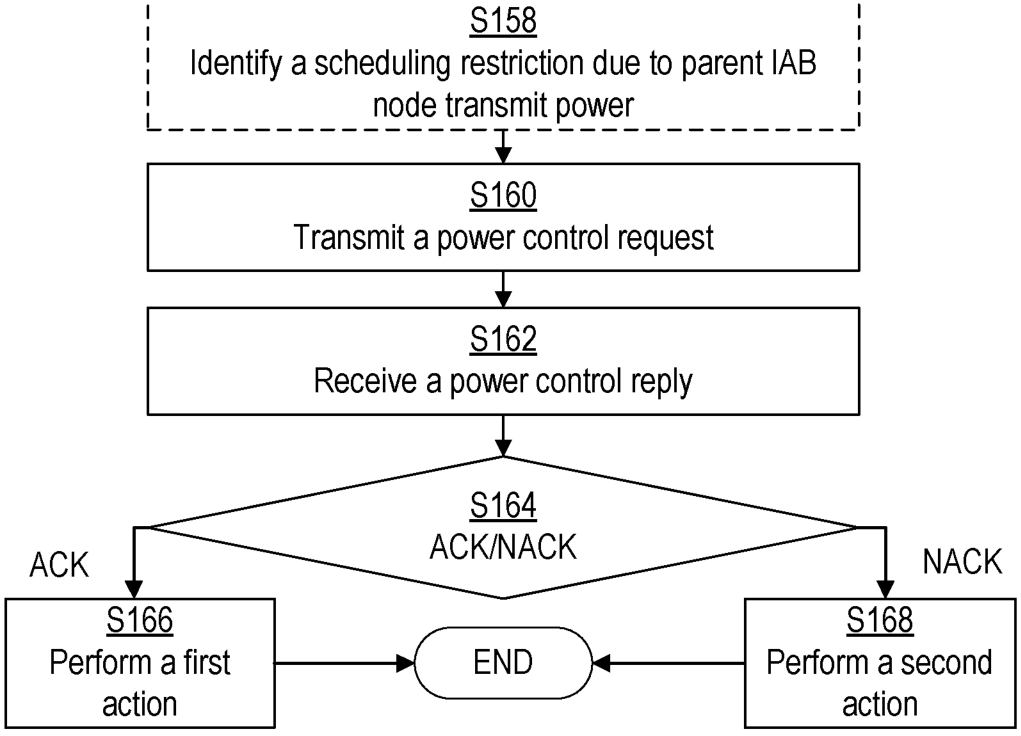

FIG. 13

POWER CONTROL BETWEEN INTEGRATED ACCESS AND BACKHAUL (IAB) NODES

CROSS-REFERENCE TO RELATED APPLICATIONS

This application is a Submission Under 35 U.S.C. § 371 for U.S. National Stage Patent Application of International Application No.: PCT/EP2021/072048, filed Aug. 6, 2021, entitled "POWER CONTROL BETWEEN INTEGRATED ACCESS AND BACKHAUL (IAB) NODES," which claims priority to U. S. Provisional Application No.: 63/062,631, filed Aug. 7, 2020, entitled "POWER CONTROL BETWEEN IAB NODES," the entireties of both of which are incorporated herein by reference.

TECHNICAL FIELD

The present disclosure relates to wireless communications, and in particular, to power control between integrated access and backhaul (JAB) nodes.

BACKGROUND

In 3$^{rd}$ Generation Partnership Project (3GPP) Release 17 (Rel-17), there is a new Work Item (WI) on enhancement to Integrated Access Backhaul (JAB) based on 3GPP Release 16 (Rel-16) IAB WI document (WID), and the earlier study item documented in 3GPP Technical Report (TR) 38.874. The purpose of IAB is to replace existing wired backhaul or a wireless backhaul with flexible wireless backhaul using the existing 3GPP bands providing not only backhaul but also existing cellular services in the same node.

Each IAB node holds a Distributed Unit (DU) function and a Mobile Termination (MT) function as shown in reference architecture depicted in section 6.3.1-1 in the "WI on enhancement to IAB". Via the MT, the IAB node connects to an upstream IAB node, which could also be a donor node. Via the DU, the IAB node establishes radio link channel (RLC) channels to MTs of downstream IAB nodes or provides access links to wireless devices (WD, also called user equipments or WDs). FIG. 1 conceptually shows possible connections for an IAB node, including access link to WDs and backhaul links to both an upstream parent and a downstream child JAB node.

An IAB node carries out two types of transmissions:

MT transmissions towards the parent IAB node, and

DU transmissions towards devices and child IAB nodes.

An IAB node also carries out two types of receptions:

MT receptions from the parent IAB node DU transmission, and

DU receptions from devices and child IAB node MT transmission.

Typically, IAB-MT transmission or reception is determined by the parent IAB-DU, while IAB-DU transmission or reception to and from a WD or child IAB node are under control of the IAB node. In many ways, the MT acts as a WD towards its parent IAB-DU, and much of its behaviour is inherited from normal WD behaviour. As such, the parent IAB-DU controls an IAB-MT in terms of transmit power and scheduling both for its uplink (UL) and downlink (DL). The IAB node has the corresponding control over its IAB children and WDs that are connected to it.

SUMMARY

Some embodiments advantageously provide methods, systems, and apparatuses for power control between integrated access and backhaul (IAB) nodes.

In one embodiment, a network node is configured to transmit a power control request to a second network node; receive a power control response from the second network node; and perform at least one action towards a third node based at least in part on the power control response.

In one embodiment, a network node is configured to receive a power control request from a second network node; and transmit a power control response to the second network node.

According to one aspect of the disclosure, a first node is provided. The first node includes processing circuitry configured to transmit a power control request to a parent, integrated access and backhaul, IAB, node where the power control request is configured to request an adjustment of a transmission power of the parent IAB node, receive a power control response from the parent IAB node, and perform at least one action associated with a second node based at least in part on the power control response.

According to one or more embodiments of this aspect, the at least one action includes scheduling the second node simultaneously with a scheduling of the first node. According to one or more embodiments of this aspect, the power control response is an acknowledgment that indicates the transmission power of the parent IAB node is being adjusted. According to one or more embodiments of this aspect, the at least one action includes adjusting at least one parameter of transmission of the second node. According to one or more embodiments of this aspect, the adjusting of the at least one parameter of transmission of the second node includes at least one of adjusting an uplink scheduling modulation and coding scheme, MCS, of the second node, adjusting a transmit power of the second node, adjusting a resource allocation assigned to the second node, and setting a multiplexing scheme of the second node with respect to resources allocated to the first node by the parent IAB node.

According to one or more embodiments of this aspect, the at least one action includes adjusting at least one parameter of transmission of the first node. According to one or more embodiments of this aspect, the adjusting of the at least one parameter of transmission of the first node includes at least one of adjusting precoder weights of the first node to down scale a required dynamic range of the parent IAB node, adjusting a beam direction to avoid receiving a maximum transmission power from the parent IAB node, and adjusting an availability indicator to the second node. According to one or more embodiments of this aspect, the at least one action includes at least temporarily pausing a scheduling of for a wireless device that is outside of a distance threshold, and scheduling a wireless device that is within the distance threshold.

According to one or more embodiments of this aspect, the power control response is a negative acknowledgment that indicates the transmission power of the parent IAB node is not being adjusted. According to one or more embodiments of this aspect, the second node is one of a child IAB node and wireless device. According to one or more embodiments of this aspect, the first node is one of an IAB node and wireless device.

According to another aspect of the disclosure, a method implemented by a first node is provided. A power control request is transmitted to a parent, integrated access and backhaul, IAB, node where the power control request is configured to request an adjustment of a transmission power of the parent IAB node. A power control response is received from the parent IAB node. At least one action associated with a second node is performed based at least in part on the power control response.

According to one or more embodiments of this aspect the at least one action includes scheduling the second node simultaneously with a scheduling of the first node. According to one or more embodiments of this aspect, the power control response is an acknowledgment that indicates the transmission power of the parent IAB node is being adjusted. According to one or more embodiments of this aspect, the at least one action includes adjusting at least one parameter of transmission of the second node. According to one or more embodiments of this aspect, the adjusting of the at least one parameter of transmission of the second node includes at least one of: adjusting an uplink scheduling modulation and coding scheme, MCS, of the second node, adjusting a transmit power of the second node, adjusting a resource allocation assigned to the second node, and setting a multiplexing scheme of the second node with respect to resources allocated to the first node by the parent IAB node.

According to one or more embodiments of this aspect, the at least one action includes adjusting at least one parameter of transmission of the first node. According to one or more embodiments of this aspect, the adjusting of the at least one parameter of transmission of the first node includes at least one of: adjusting precoder weights of the first node to down scale a required dynamic range of the parent IAB node, adjusting a beam direction to avoid receiving a maximum transmission power from the parent IAB node, and adjusting an availability indicator to the second node. According to one or more embodiments of this aspect, the at least one action includes: at least temporarily pausing a scheduling of for a wireless device that is outside of a distance threshold, and scheduling a wireless device that is within the distance threshold.

According to one or more embodiments of this aspect, the power control response is a negative acknowledgment that indicates the transmission power of the parent IAB node is not being adjusted. According to one or more embodiments of this aspect, the second node is one of a child IAB node and wireless device. According to one or more embodiments of this aspect, the first node is one of an IAB node and wireless device.

According to another aspect of the disclosure, a parent, integrated access and backhaul, IAB, node is provided. The parent IAB node includes processing circuitry configured to: receive a power control request from a first node where the power control request is configured to request an adjustment of a transmission power of the parent IAB node, and cause transmission of a power control response to the first node where the power control response indicates whether the transmission power of the parent IAB node is being adjusted.

According to one or more embodiments of this aspect, the power control response is configured to at least in part cause the first node to perform at least on action associated with a second node. According to one or more embodiments of this aspect, the at least one action includes scheduling the second node simultaneously with a scheduling of the first node. According to one or more embodiments of this aspect, the power control response is an acknowledgment that indicates the transmission power of the parent IAB node is being adjusted.

According to one or more embodiments of this aspect, the at least one action includes adjusting at least one parameter of transmission of the second node. According to one or more embodiments of this aspect, the adjusting of the at least one parameter of transmission of the second node includes at least one of: adjusting an uplink scheduling modulation and coding scheme, MCS, of the second node, adjusting a transmit power of the second node, adjusting a resource allocation assigned to the second node, and setting a multiplexing scheme of the second node with respect to resources allocated to the first node by the parent IAB node. According to one or more embodiments of this aspect, the at least one action includes adjusting at least one parameter of transmission of the first node.

According to one or more embodiments of this aspect, the adjusting of the at least one parameter of transmission of the first node includes at least one of adjusting precoder weights of the first node to down scale a required dynamic range of the parent IAB node, adjusting a beam direction to avoid receiving a maximum transmission power from the parent IAB node, and adjusting an availability indicator to the second node. According to one or more embodiments of this aspect, the at least one action includes: at least temporarily pausing a scheduling of for a wireless device that is outside of a distance threshold, and scheduling a wireless device that is within the distance threshold. According to one or more embodiments of this aspect, the power control response is a negative acknowledgment that indicates the transmission power of the parent IAB node is not being adjusted.

According to one or more embodiments of this aspect, the second node is one of a child IAB node and wireless device. According to one or more embodiments of this aspect, the first node is one of an IAB node and wireless device. According to another aspect of the disclosure, a method implemented by a parent, integrated access and backhaul, IAB, node is provided. A power control request is received from a first node where the power control request is configured to request an adjustment of a transmission power of the parent IAB node. Transmission is caused of a power control response to the first node where the power control response indicates whether the transmission power of the parent IAB node is being adjusted.

According to one or more embodiments of this aspect, the power control response is configured to at least in part cause the first node to perform at least on action associated with a second node. According to one or more embodiments of this aspect, the at least one action includes scheduling the second node simultaneously with a scheduling of the first node. According to one or more embodiments of this aspect, the power control response is an acknowledgment that indicates the transmission power of the parent IAB node is being adjusted.

According to one or more embodiments of this aspect, the at least one action includes adjusting at least one parameter of transmission of the second node. According to one or more embodiments of this aspect, the adjusting of the at least one parameter of transmission of the second node includes at least one of: adjusting an uplink scheduling modulation and coding scheme, MCS, of the second node, adjusting a transmit power of the second node, adjusting a resource allocation assigned to the second node, and setting a multiplexing scheme of the second node with respect to resources allocated to the first node by the parent IAB node. According to one or more embodiments of this aspect, the at least one action includes adjusting at least one parameter of transmission of the first node.

According to one or more embodiments of this aspect, the adjusting of the at least one parameter of transmission of the first node includes at least one of: adjusting precoder weights of the first node to down scale a required dynamic range of the parent IAB node, adjusting a beam direction to avoid receiving a maximum transmission power from the parent IAB node, and adjusting an availability indicator to the second node. According to one or more embodiments of this aspect, the at least one action includes: at least temporarily pausing a scheduling of for a wireless device that is outside of a distance threshold; and scheduling a wireless device that is within the distance threshold. According to one or more embodiments of this aspect, the power control response is a negative acknowledgment that indicates the transmission power of the parent IAB node is not being adjusted. According to one or more embodiments of this aspect, the second node is one of a child IAB node and wireless device. According to one or more embodiments of this aspect, the first node is one of an IAB node and wireless device.

According to another aspect of the disclosure, a wireless device is provided. The wireless device includes processing circuitry configured to at least one of: receive a first transmission from a first node where at least one parameter of the first transmission has been adjusted based at least in part on whether a transmission power of the parent, integrated access and backhaul, IAB, node was adjusted in response to a power control request and cause a second transmission to the first node where at least one parameter of the second transmission is based at least in part on whether a transmission power of the parent IAB node was adjusted in response to a power control request.

According to one or more embodiments of this aspect, the adjusted at least one parameter of the second transmission includes at least one of: an adjusted uplink scheduling modulation and coding scheme, MCS, of the wireless device, an adjusted transmit power of the wireless device, an adjusted resource allocation assigned to the wireless device, and setting a multiplexing scheme of the wireless device with respect to resources allocated to the first node by a parent IAB node of the first node. According to one or more embodiments of this aspect, the adjusted at least one parameter of the first transmission includes at least one of: an adjusted precoder weight; and an adjusted availability indicator. According to one or more embodiments of this aspect, the first node is a wireless device.

According to another aspect of the disclosure, a method implemented by a wireless device is provided. A first transmission is received from a first node where at least one parameter of the first transmission has been adjusted based at least in part on whether a transmission power of the parent, integrated access and backhaul, IAB, node was adjusted in response to a power control request. A second transmission is caused to the first node where at least one parameter of the second transmission is based at least in part on whether a transmission power of the parent IAB node was adjusted in response to a power control request. According to one or more embodiments of this aspect, the adjusted at least one parameter of the second transmission includes at least one of: an adjusted uplink scheduling modulation and coding scheme, MCS, of the wireless device, an adjusted transmit power of the wireless device, an adjusted resource allocation assigned to the wireless device, and setting a multiplexing scheme of the wireless device with respect to resources allocated to the first node by a parent IAB node of the first node. According to one or more embodiments of this aspect, the adjusted at least one parameter of the first transmission includes at least one of an adjusted precoder weight, and an adjusted availability indicator. According to one or more embodiments of this aspect, the first node is one of a IAB node and another wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 12 is a flowchart of an example process in a wireless device according to some embodiments of the present disclosure; and FIG. 13 is a flowchart of an example process according to some embodiments of the present disclosure.

DETAILED DESCRIPTION

Figure 1:
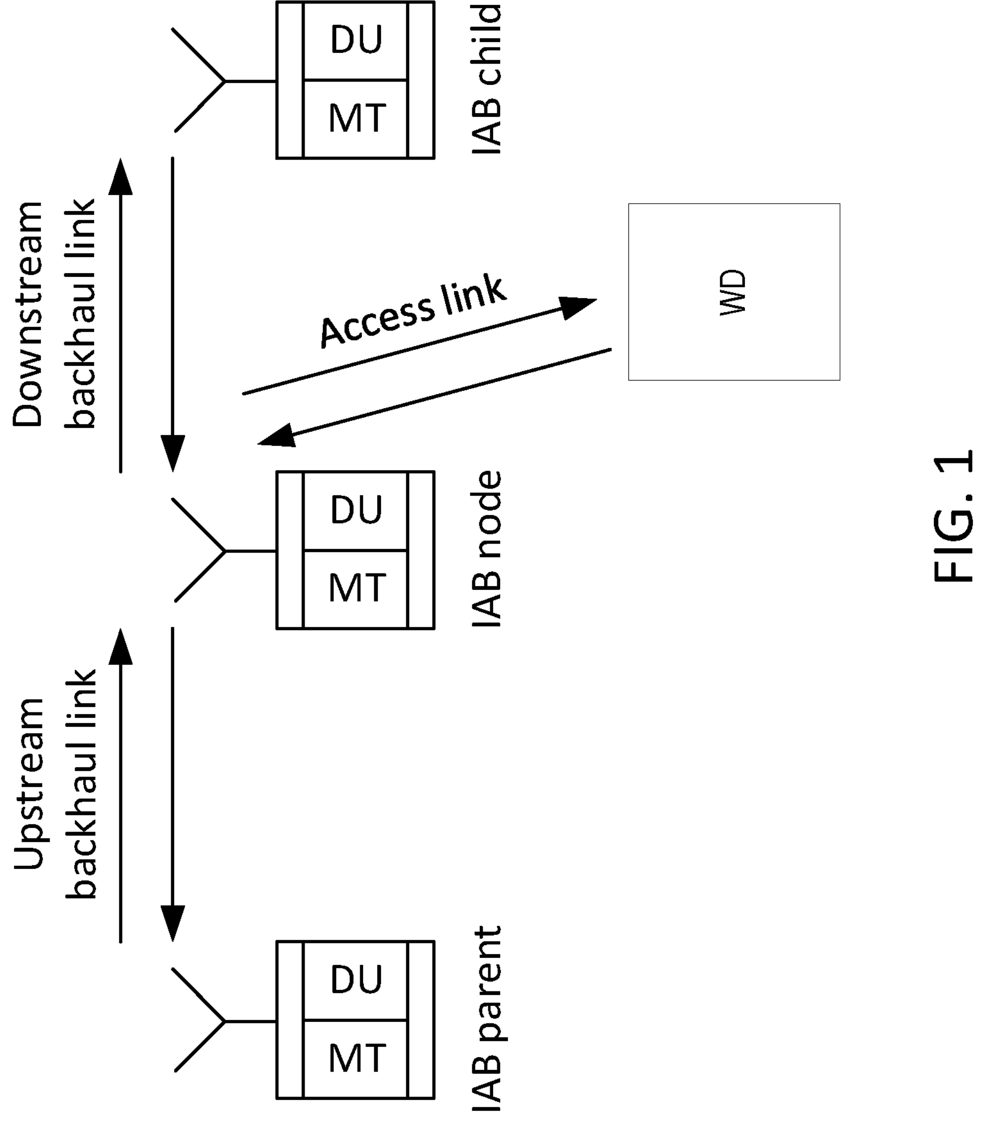
FIG. 1 illustrates an example of IAB-MT and IAB-DU for backhaul and access link.

Existing cellular networks typically communicate in a strict hierarchy regarding power control—the DU (gNB or network node) is in control and the WD follows. Furthermore, the DU typically uses a fixed transmit power per subcarrier and only changes the modulation and coding scheme (MCS) in order to compensate for a changing communication channel. By the introduction of IAB nodes, the same strict one-sided relation may no longer be preferable. For example, an IAB node may be prevented from receiving a signal from a weaker and/or more distant transmitting WD due to simultaneous reception from a stronger transmitting parent IAB node. Presently, there is no functionality in 3GPP specification that allows for such simultaneous operation. Furthermore, it may be desired from a network perspective to maximize overall network performance, something that may not be feasible without the parent IAB node changing transmit power.

Some embodiments of the present disclosure provide arrangements to allow for a bilateral or upstream power control in order to e.g., increase the network performance. Some embodiments of the present disclosure provide arrangements to allow an IAB node to request a change of the transmit power of a parent IAB node in order for the IAB node to obtain more favorable channel or reception conditions towards child IAB nodes and/or WDs that are connected to the IAB node. This may be, e.g., to reduce parent IAB node transmit (Tx) power such that the IAB node is able to simultaneously receive a still relatively strong parent IAB node signal and a weaker WD and/or child IAB node signal which otherwise may not be feasible to receive jointly.

As such, in some embodiments, the IAB node may first transmit a power control request to the parent IAB node. Upon receiving a power control reply, the IAB node, based on the reply, may perform an action towards a child IAB node or a WD. In its simplest form, the reply may be an acknowledgment/non-acknowledgement (ACK/NACK), where a NACK may be used when the parent IAB node is not able to decrease or increase its transmit power any more than what is already the case.

Some embodiments may advantageously allow an IAB node to request a parent IAB node to change its transmit power, which most often is a small expense, in order to allow for more flexible scheduling and thereby to use its own resources more efficiently. In some embodiments, the wireless device may request for a parent IAB node to change its transmit power as described herein. Hence, overall network performance can be increased as compared to arrangements which are not configured to operate in this manner.

Before describing in detail example embodiments, it is noted that the embodiments reside primarily in combinations of apparatus components and processing steps related to power control between integrated access and backhaul (IAB) nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term “radio node” used herein may be used to also denote a wireless device (WD) such as a wireless device (WD) or a radio network node.

In some embodiments, the non-limiting terms wireless device (WD) or a user equipment (WD) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term “radio network node” is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the general term “node” is used and may indicate a node that may be either a network node or a WD. Any two or more embodiments described in this disclosure may be combined in any way with each other.

The term “signaling” or “communication” used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g., a signaling radio node and/or node arrangement (e.g., network node), configures a WD or another network node, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Receiving information may comprise receiving one or more information messages (e.g., parameters, reports, request, response, scheduling information such as a scheduling downlink control information message, or other scheduling information associated with a child IAB node, etc.). In some embodiments, it may be considered that receiving signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g., based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure.

A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g., a specific block of data and/or transport block.

In some embodiments, the general term "resource" is intended to indicate a frequency resource and/or a time resource. In some embodiments, the general term "resource allocation" is intended to indicate a frequency resource allocation and/or a time resource allocation.

The term time resource used herein may correspond to any type of physical resource or radio resource expressed in terms of length of time. Examples of time resources are: symbol, time slot, sub-slot, subframe, radio frame, TTI, interleaving time, etc. As used herein, in some embodiments, the terms "subframe," "slot," "sub-slot", "sub-frame/slot" and "time resource" are used interchangeably and are intended to indicate a time resource and/or a time resource number.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
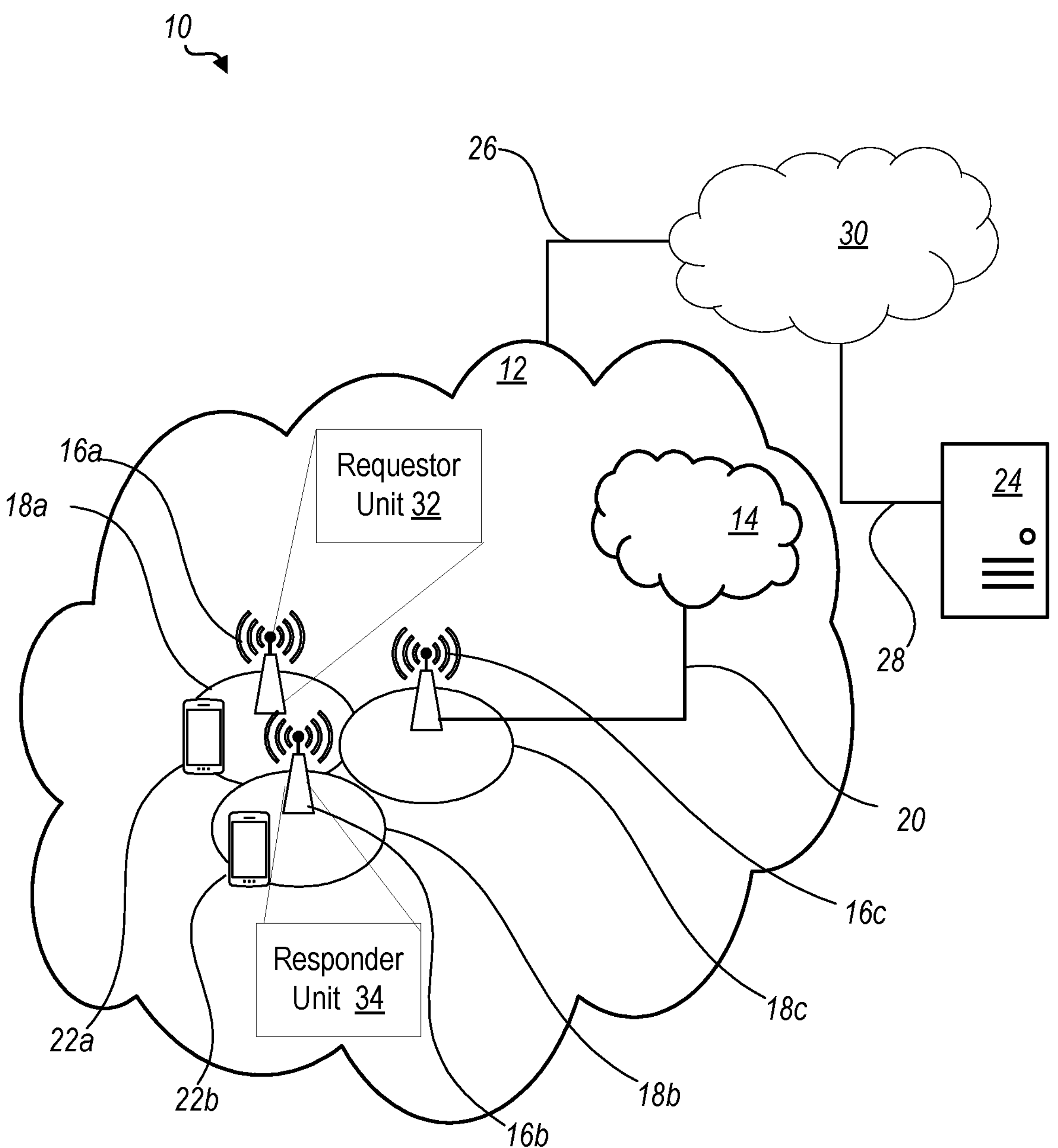
FIG. 2 is a schematic diagram of an example network architecture illustrating a communication system connected via an intermediate network to a host computer according to the principles in the present disclosure.

Some embodiments provide power control between integrated access and backhaul (IAB) nodes. Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a requestor unit 32 which is configured to transmit a power control request to a second network node; receive a power control response from the second network node; and perform at least one action towards a third node based at least in part on the power control response. A network node 16 is configured to include a responder unit 34 which is configured to receive a power control request from a second network node; and transmit a power control response to the second network node. Further, in some embodiments, WD 22 may be configured with requestor unit 32 such that WD 22 is able to transmit a power control request to the parent IAB, receive a power control response and perform at least one action associated with a second node based at least in part on the power control response.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, in one embodiment, processing circuitry 68 of the network node 16 (e.g., IAB node) may include requestor unit 32 configured to perform network node methods discussed herein, such as the methods discussed with reference to, for example, FIGS. 8 and 9 as well as other figures. In some embodiments, the processing circuitry 68 of the network node 16 (e.g., parent IAB node of IAB node) may include a responder unit 34 configured to perform network node methods discussed herein, such as the methods discussed with reference to, for example, FIGS. 10 and 11 as well as other figures.

Figure 3:
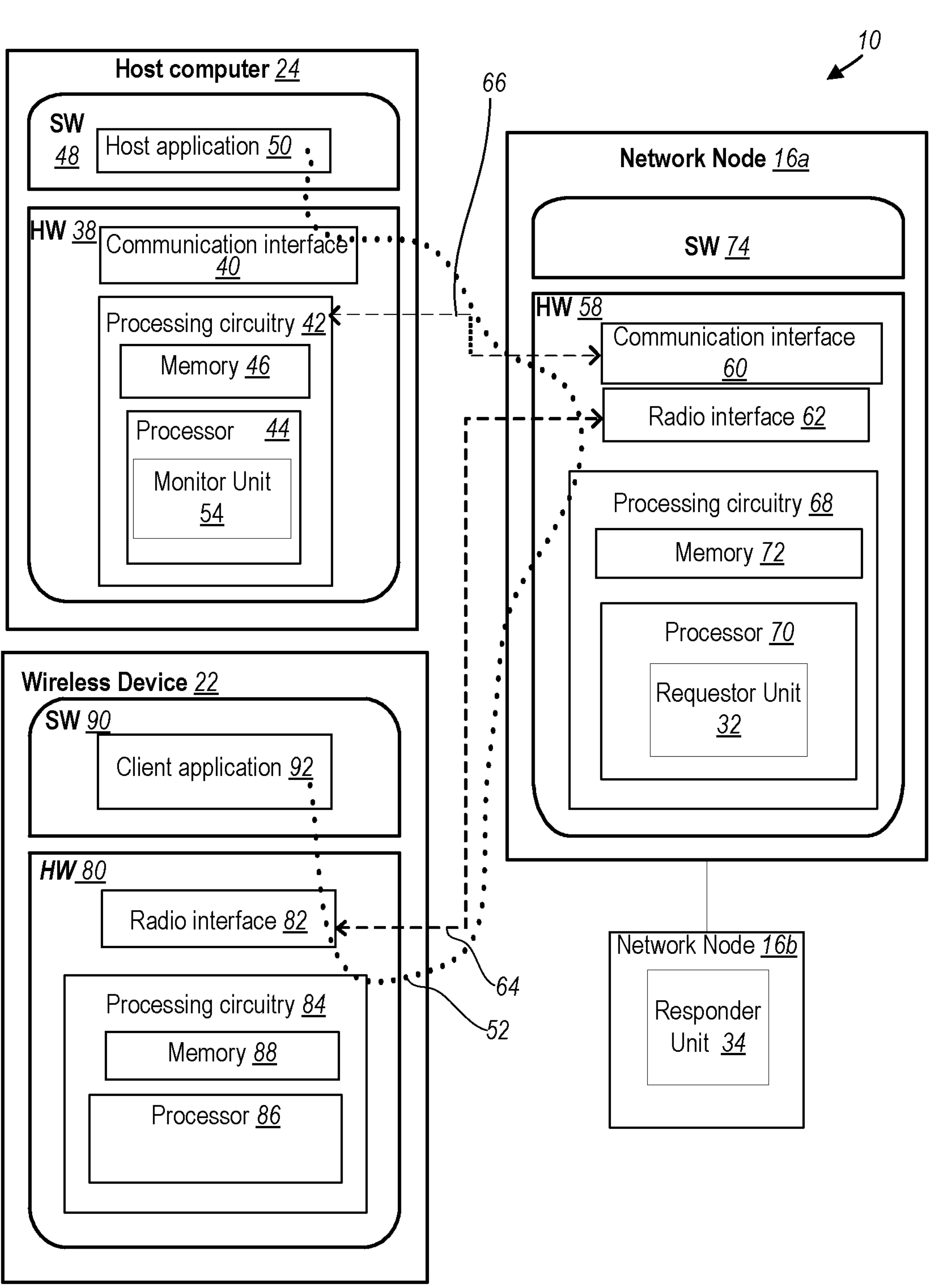
FIG. 3 is a block diagram of a host computer communicating via a network node with a wireless device over an at least partially wireless connection according to some embodiments of the present disclosure.

Although FIG. 3 shows the requestor unit 32 and responder unit 34 in separate network nodes 16, in some embodiments, both the requestor unit 32 and responder unit 34 may be included in the network node 16 (e.g., since, in some embodiments, an IAB node may be both a child IAB to one IAB node and simultaneously a parent IAB node to another IAB node).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as requestor unit 32, and responder unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
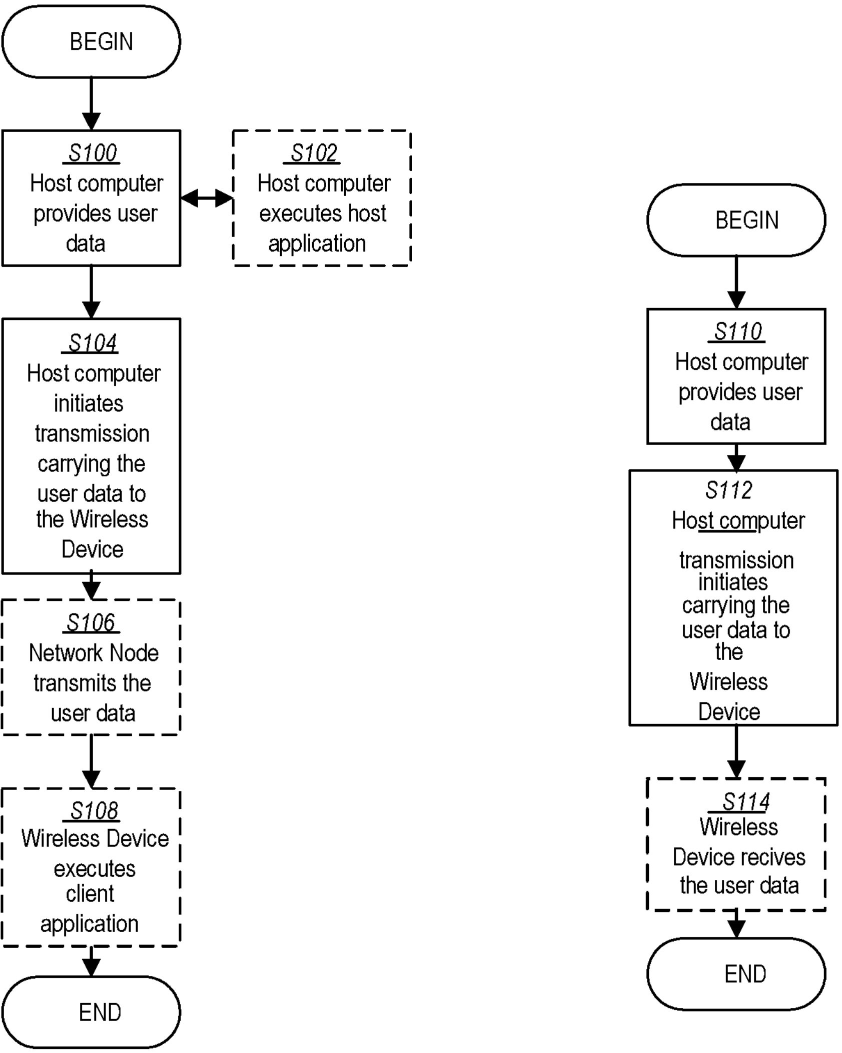
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
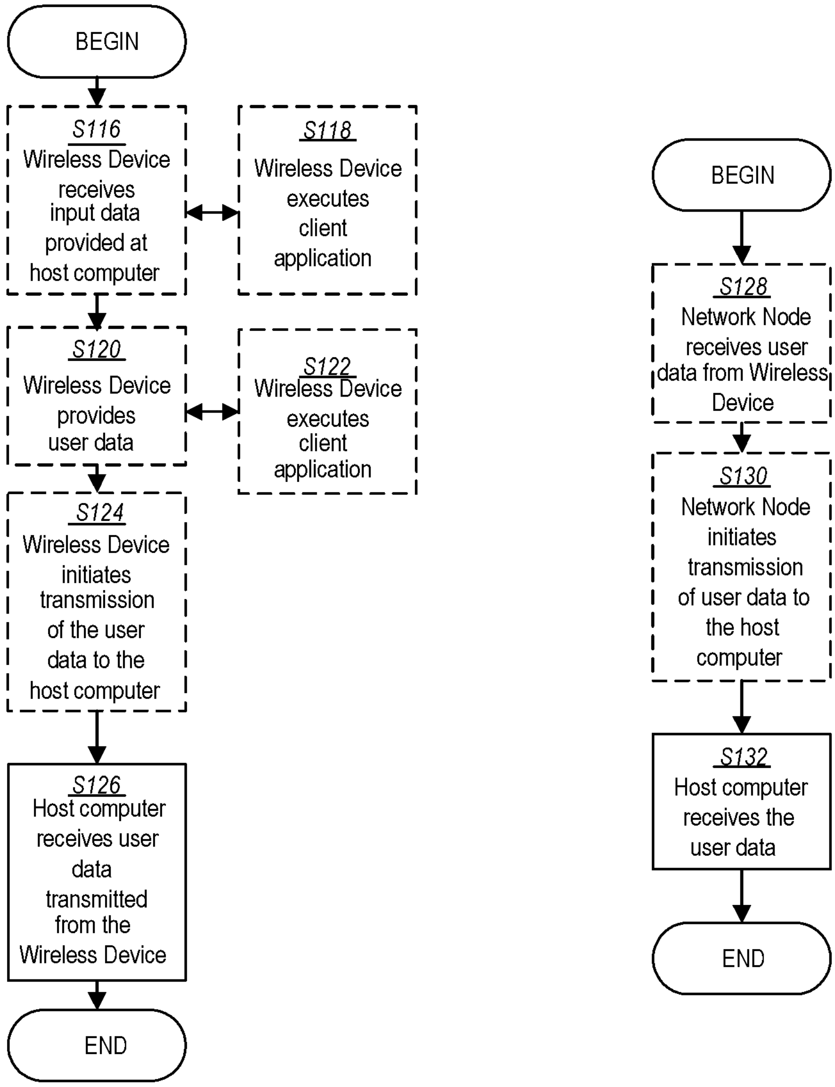
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figures 8, 9:
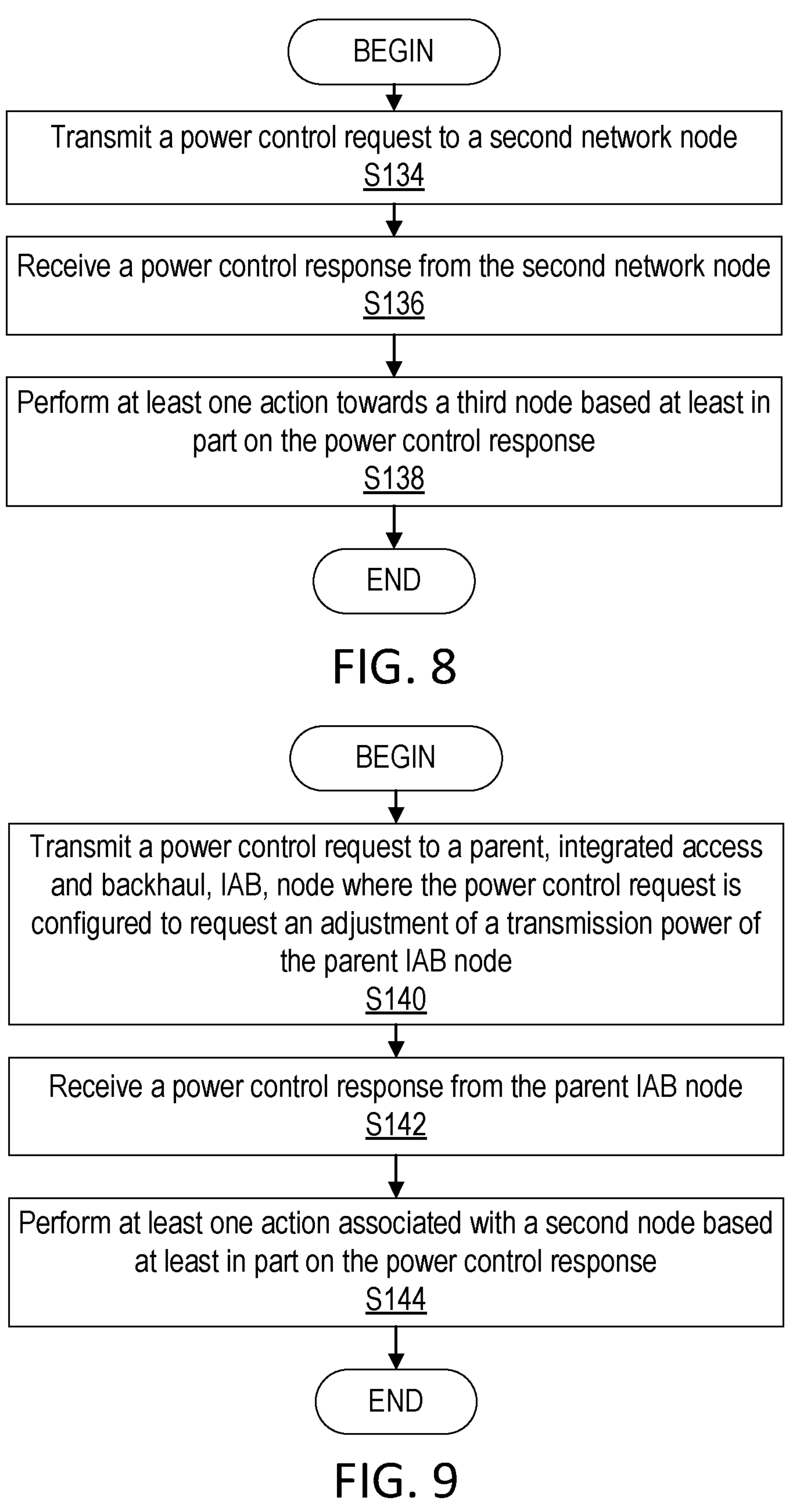
FIG. 8 is a flowchart of an example process in a network node according to some embodiments of the present disclosure.
FIG. 9 is a flowchart of an example process in a node according to some embodiments of the present disclosure.

FIG. 8 is a flowchart of an example process in a network node 16 (e.g., IAB node) according to some embodiments of the present disclosure. One or more Blocks and/or functions and/or methods performed by the network node 16 may be performed by one or more elements of network node 16 such as by requestor unit 32 in processing circuitry 68, processor 70, communication interface 60, radio interface 62, etc. according to the example method. The example method includes transmitting (Block S134) a power control request to a second network node. The method includes receiving (Block S136) a power control response from the second network node. The method includes performing (Block S138) at least one action towards a third node based at least in part on the power control response.

In some embodiments, the network node is an Integrated Access Backhaul (IAB) node, the second network node is a parent IAB node of the network node and the third node is one of the WD and a child IAB node of the network node. In some embodiments, one of more of: the power control response comprises one of an acknowledged (ACK) and a non-acknowledgement (NACK) to the power control request; the power control response includes a value of a power control change; the at least one action comprises communicating with the third node and based on whether the response is an ACK or a NACK and modify at least one parameter for the third node; the at least one parameter includes at least one of: scheduling modulation and coding scheme (MCS) of the third node, transmit power of third node, resource allocation of communication between the network node and the third node, precoder weights of the IAB node 16*a*, a multiplexing scheme and/or an availability indicator; the power control request is based at least in part on a power control capability report from the second network node; the report includes a dynamic range of a power control of the second network node; the power control request is based at least in part on a determination of a scheduling restriction associated with the second network node; and the power control request indicates a target power value or a power change value.

FIG. 9 is a flowchart of an example process in a first node (e.g., network node 16 or wireless device 22) according to some embodiments of the present disclosure. One or more Blocks and/or functions and/or methods performed by the network node 16 or wireless device 22 may be performed by one or more elements of network node 16 or wireless device 22 such as by requestor unit 32 in processing circuitry 68, processor 70, communication interface 60, radio interface 62, requestor unit 32 in processing circuitry 84, processor 86, radio interface 82, etc. The first node is configured to transmit (Block S140) a power control request to a parent, integrated access and backhaul, IAB, node where the power control request is configured to request an adjustment of a transmission power of the parent IAB node, as described herein. The first node is configured to receive (Block S142) a power control response from the parent IAB node, as described herein. The first node 16, 22 is configured to perform (Block S144) at least one action associated with a second node 16, 22 based at least in part on the power control response, as described herein.

According to one or more embodiments, the at least one action includes scheduling the second node 16, 22 simultaneously with a scheduling of the first node 16, 22. According to one or more embodiments, the power control response is an acknowledgment that indicates the transmission power of the parent IAB node 16 is being adjusted. According to one or more embodiments, the at least one action includes adjusting at least one parameter of transmission of the second node 16, 22.

According to one or more embodiments, the adjusting of the at least one parameter of transmission of the second node 16, 22 includes at least one of: adjusting an uplink scheduling modulation and coding scheme, MCS, of the second node 16, 22, adjusting a transmit power of the second node 16, 22, adjusting a resource allocation assigned to the second node 16, 22, and setting a multiplexing scheme of the second node 16, 22 with respect to resources allocated to the first node 16, 22 by the parent IAB node 16. According to one or more embodiments, the at least one action includes adjusting at least one parameter of transmission of the first node 16, 22. According to one or more embodiments, the adjusting of the at least one parameter of transmission of the first node 16, 22 includes at least one of adjusting precoder weights of the first node 16, 22 to down scale a required dynamic range of the parent IAB node 16, adjusting a beam direction to avoid receiving a maximum transmission power from the parent IAB node 16, and adjusting an availability indicator to the second node 16, 22.

According to one or more embodiments, the at least one action includes: at least temporarily pausing a scheduling of for a wireless device 22 that is outside of a distance threshold, and scheduling a wireless device 22 that is within the distance threshold. According to one or more embodiments, the power control response is a negative acknowledgment that indicates the transmission power of the parent IAB node 16 is not being adjusted. According to one or more embodiments, the second node 16, 22 is one of a child IAB node 16 and wireless device 22. According to one or more embodiments, the first node 16, 22 is one of an IAB node and wireless device 22.

Figures 10, 11:
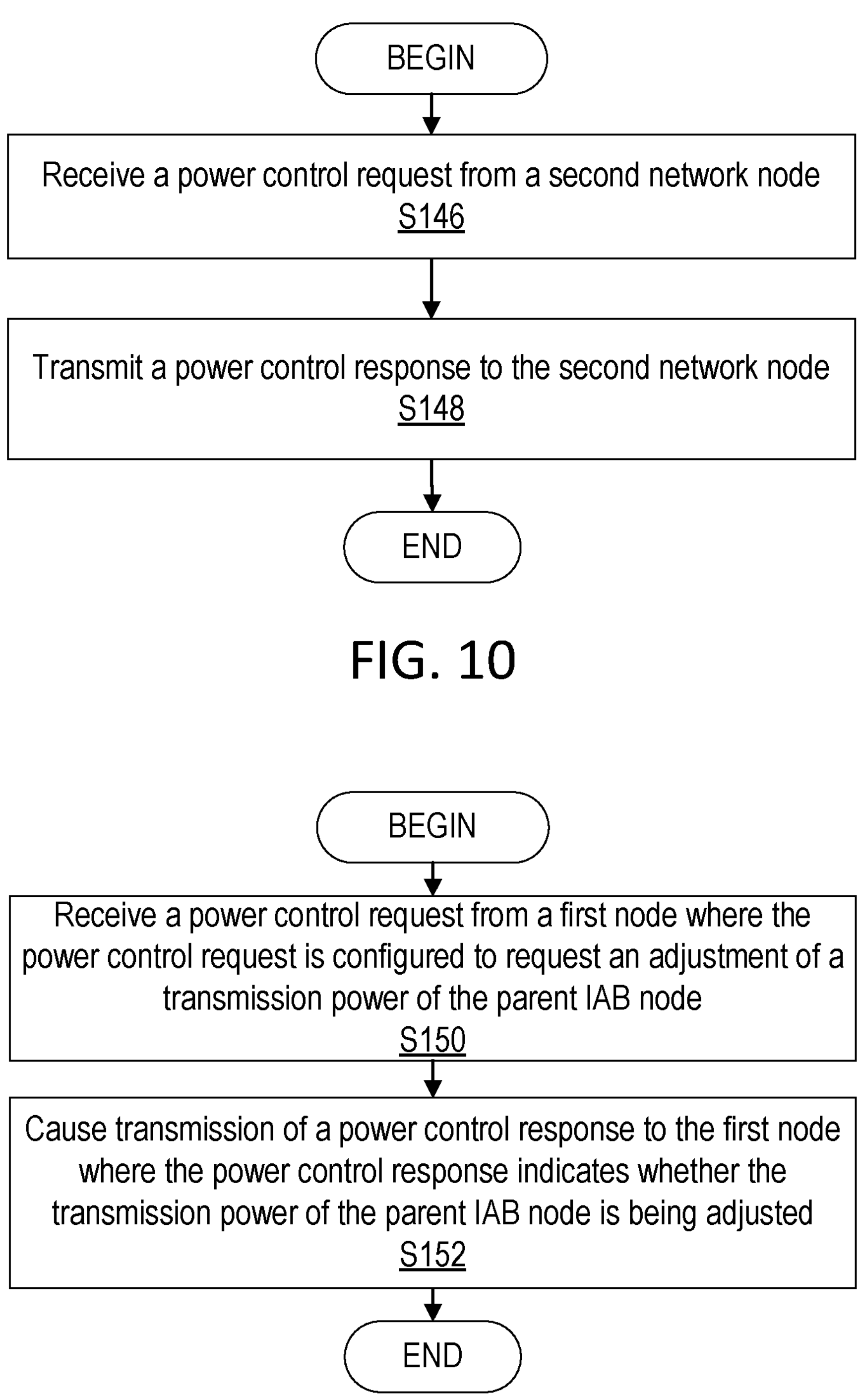
FIG. 10 is a flowchart of an example process in a network node according to some embodiments of the present disclosure.
FIG. 11 is a flowchart of another example process in a network node according to some embodiments of the present disclosure.

FIG. 10 is a flowchart of an example process in a network node 16 (e.g., parent IAB node) according to some embodiments of the present disclosure. One or more Blocks and/or functions and/or methods performed by the network node 16 may be performed by one or more elements of network node 16 such as by responder unit 34 in processing circuitry 68, processor 70, communication interface 60, radio interface 62, etc. according to the example method. The example method includes receiving (Block S146) a power control request from a second network node. The method includes transmitting (Block S148) a power control response to the second network node.

In some embodiments, the network node 16 is a parent Integrated Access Backhaul (IAB) node 16 of the second network node 16 and the second network node 16 is a child IAB node 16 of the network node 16. In some embodiments, one of more of: the power control response comprises one of an acknowledged (ACK) and a non-acknowledgement (NACK) to the power control request; the power control response includes a value of a power control change; the power control request is based at least in part on a power control capability report sent by the network node 16 to the second network node 16 prior to receipt of the power control request; the report includes a dynamic range of a power control of the network node 16; the power control request is based at least in part on a determination of a scheduling restriction associated with the network node 16; and the power control request indicates a target power value or a power change value.

FIG. 11 is a flowchart of an example process in a network node 16 (e.g., parent IAB node) according to some embodiments of the present disclosure. One or more Blocks and/or functions and/or methods performed by the network node 16 may be performed by one or more elements of network node 16 such as by responder unit 34 in processing circuitry 68, processor 70, communication interface 60, radio interface 62, etc. The network node 16 is configured to receive (Block S150) a power control request from a first node 16, 22 where the power control request is configured to request an adjustment of a transmission power of the parent IAB node 16, as described herein. The network node 16 is configured to cause (Block S152) transmission of a power control response to the first node where the power control response indicates whether the transmission power of the parent IAB node 16 is being adjusted, as described herein.

According to one or more embodiments, the power control response is configured to at least in part cause the first node 16, 22 to perform at least on action associated with a second node 16, 22. According to one or more embodiments, the at least one action includes scheduling the second node simultaneously with a scheduling of the first node 16, 22. According to one or more embodiments, the power control response is an acknowledgment that indicates the transmission power of the parent IAB node 16 is being adjusted.

According to one or more embodiments, the at least one action includes adjusting at least one parameter of transmission of the second node 16, 22. According to one or more embodiments, the adjusting of the at least one parameter of transmission of the second node 16, 22 includes at least one of: adjusting an uplink scheduling modulation and coding scheme, MCS, of the second node 16, 22, adjusting a transmit power of the second node 16, 22, adjusting a resource allocation assigned to the second node 16, 22, and setting a multiplexing scheme of the second node 16, 22 with respect to resources allocated to the first node 16, 22 by the parent IAB node 16.

According to one or more embodiments, the at least one action includes adjusting at least one parameter of transmission of the first node 16. According to one or more embodiments, the adjusting of the at least one parameter of transmission of the first node 16, 22 includes at least one of adjusting precoder weights of the first node 16, 22 to down scale a required dynamic range of the parent IAB node 16, adjusting a beam direction to avoid receiving a maximum transmission power from the parent IAB node 16, and adjusting an availability indicator to the second node 16, 22. According to one or more embodiments, the at least one action includes: at least temporarily pausing a scheduling of for a wireless device 22 that is outside of a distance threshold, and scheduling a wireless device 22 that is within the distance threshold.

According to one or more embodiments, the power control response is a negative acknowledgment that indicates the transmission power of the parent IAB node 16 is not being adjusted. According to one or more embodiments, the second node 16, 22 is one of a child IAB node 16 and wireless device 22. According to one or more embodiments, the first node 16 is one of an IAB node 16 and wireless device 22.

FIG. 12 is a flowchart of an example process in a wireless device 22 according to some embodiments of the present disclosure. One or more Blocks and/or functions and/or methods performed by the wireless device 22 may be performed by one or more elements of wireless device 22 such as by processing circuitry 84, processor 86, radio interface 82, etc. The wireless device 22 is configured to receive (Block S154) a first transmission from a first node 16, 22 where at least one parameter of the first transmission has been adjusted based at least in part on whether a transmission power of the parent, integrated access and backhaul, IAB, node 16 was adjusted in response to a power control request, as described herein. The wireless device 22 is configured to cause (Block S156) a second transmission to the first node 16, 22 where at least one parameter of the second transmission is based at least in part on whether a transmission power of the parent IAB node 16 was adjusted in response to a power control request, as described herein.

According to one or more embodiments, the adjusted at least one parameter of the second transmission includes at least one of: an adjusted uplink scheduling modulation and coding scheme, MCS, of the wireless device 22, an adjusted transmit power of the wireless device 22, an adjusted resource allocation assigned to the wireless device 22 and setting a multiplexing scheme of the wireless device 22 with respect to resources allocated to the first node 16, 22 by a parent IAB node 16 of the first node 16, 22. According to one or more embodiments, the adjusted at least one parameter of the first transmission includes at least one of: an adjusted precoder weight, and an adjusted availability indicator. According to one or more embodiments, the first node 16, 22 is one of a IAB node 16 and another wireless device 22.

Having described the general process flow of arrangements of the disclosure and having provided examples of hardware and software arrangements for implementing the processes and functions of the disclosure, the sections below provide details and examples of arrangements for power control between integrated access and backhaul (IAB) nodes, which may be implemented by one or more network nodes 16 (e.g., IAB node 16*a* and parent IAB node 16*b*), wireless device 22 and/or host computer 24. That is, one or more functions described below may be performed by a network node 16 such as via one or more of processing circuitry 68, processor 70, radio interface 62, requestor unit 32, responder unit 34, etc. and/or by wireless device 22 such as via processing circuitry 84, processor 86, radio interface 82, etc.

Some embodiments of the present disclosure provide arrangements to allow an IAB node 16*a* to request to change the transmit power of a parent IAB node 16*b* in order for the IAB node 16*a* to obtain more favorable channel conditions towards its child IAB nodes (e.g., child IAB node 16*c*) and/or WDs 22 that are connected to the IAB node 16*a*. For example, the receiver dynamic range in the IAB node 16*a* may not be sufficient to simultaneously receive a strong signal from a parent IAB node 16*b* and a weak signal from a weak child IAB node 16*c* and/or WD 22 that is connected to the IAB node 16*a*. Thus, some embodiments of the present disclosure provide that the IAB node 16*a* may request the parent IAB node 16*b* to reduce its transmit power or to revert to a possibly less desirable, more conservative scheduling scheme, e.g., where the parent IAB node 16*b* and child IAB node 16*c* or WD 22 are not scheduled simultaneously, or are arranged in non-overlapping resources. In some embodiments, the fundamental relation that a parent IAB-DU controls the child IAB-MT may be maintained by the parent IAB node 16*b* not being obliged to follow the request.

Some embodiments are summarized in FIG. 13 and may include one or more of the following steps.

In an optional initial step (S158), the IAB node 16*a* identifies that a scheduling restriction due to the parent IAB node 16*b* transmit power exists. This is discussed in more detail below.

In another step (S160), the IAB node 16*a* transmits a power control request to the parent IAB node 16*b*. The request may include a value of the change in transmit power or the absolute value of the requested transmit power of the parent IAB node 16*b* or a multiple of pre-configured or pre-negotiated change unit.

In another step (S162), the IAB node 16*a* receives a power control reply in which it finds out whether or not the power control request was granted or not.

In yet another step (S164), the IAB node 16*a* may interpret the received reply. For example, the reply may in its simplest form be a single bit ACK/NACK or may be more detailed in that it may include a value, duration and/or an indication of resources that are covered by the reply. In some embodiments, the reply may include information indicating when a change in transmit power will be implemented and/or executed by the parent IAB node 16*b*. In some embodiments, in case an ACK is received, the IAB node 16*a* performs a first action (S166) whereas if a NACK is received, the IAB node 16*a* may perform a second action (S168), which may be different from the first action. In some embodiments, either ACK or NACK may furthermore be implicit such that absence of a response implies either the ACK or NACK, respectively, is given.

In one embodiment, the identification step mentioned briefly above, S110, may be performed in which the IAB node 16*a* identifies that a scheduling restriction due to the parent IAB node 16*b* transmit power exists; this step may precede the power control request transmission in step S112.

Two examples will be used to illustrate the above. In the first example, if the required receive dynamic range has been identified to be too large, in order to properly decode both the signals from a parent IAB node 16*b* and a child IAB node 16*c* or WD 22, the IAB node 16*a* may, for example, in case of a successful power control request, i.e., an ACK was received, schedule the child IAB node 16*c* and/or WD 22 simultaneously, as the parent IAB node 16*b* scheduled the IAB node 16*a*. Alternatively, in some embodiments, if a NACK was received, the child IAB node 16*c* or WD 22 may be scheduled in separate time resources from the parent IAB node 16*b*.

A second example relates to the amount of interference or distortion that the IAB node 16*a* can tolerate for a given MCS in a spatial multiplexing scheme where the IAB node 16*a* schedules a child IAB node 16*c* and/or WD 22 in the same time resources, as the parent IAB node 16*b* has allocated in downlink (DL) for the IAB node 16*a*. In this case, without a successful power control request, the IAB node 16*a* may schedule the child IAB node 16*c* and/or WD 22 with a lower MCS in order to achieve a more robust reception and achieve a certain symbol or block error rate (BLER).

In one embodiment, the power control request includes a preferred power control value, i.e., preferred change or a preferred new value. It may also include a (time-frequency) resource set for which the request is valid.

In one embodiment, the response includes an ACK/NACK message, preferably in a one bit configuration, whereas in another embodiment the response includes a value of the change in transmit power (or the new value of the transmit power, or multiple of a configured or negotiated power or power change unit) and/or a resource set that is affected by the change in transmit power.

In one embodiment, the possible actions (e.g., the first and/or second actions) to take, based on the power control response, includes one or more of the following, which may be performed by IAB node 16*a*:

Setting or adjustment of uplink (UL) scheduling MCS of the child IAB node 16*c* and/or WD 22;

- Setting or adjustment of transmit power of the child IAB node 16*c* and/or WD 22;
- Setting or adjustment of resource allocation of the child IAB node 16*c* and/or WD 22;
- Setting or adjustment of the multiplexing scheme of the child IAB node 16*c* and/or WD 22 with respect to the resource allocated to the IAB node 16*a* by the parent IAB node 16*b;*
- Adjustment of Precoder weights of IAB node 16*a* (to downscale the required dynamic range of parent IAB node 16*b*);
- Adjustment of a beam direction to avoid receiving the maximum power from the parent IAB node 16*b*; and/or
- Adjustment of the availability indicator to the child IAB node 16*c*.

In some embodiments, the difference between the first and second action is the selection of one or more of the above parameters.

In one embodiment, during configuration or later, the IAB node 16*a* has received a power control configuration report from the parent IAB node 16*b*. This report may include present transmission power, as well as the transmit power dynamic range and increments/decrements of the transmission power. The capability report may be transmitted and exchanged through, e.g., Operations, Administration and Management (OAM) signaling or by dedicated Radio Resource Control (RRC) signaling.

In some embodiments, e.g., in order to reduce the signaling overhead, the power control response may be transmitted more infrequently than the power control request, e.g., one response for every, n, number of requests (e.g., n=5), or one response per fixed time period regardless of the number of requests taking place during the same time. In that case, the IAB node 16*a* may assume that the requests are granted until a NACK is received. Alternatively, in some embodiments, the IAB node 16*a* may assume that the requests are not granted until an ACK is received. On the other hand, if a NACK is received, the IAB node 16*a* may revert all assumed power control responses that are covered by the NACK.

Some embodiments of the present disclosure may provide a method in a network IAB node 16*a* for communicating with other network nodes. The method may include one or more of the following, which may be performed by a first network node, such as, an IAB node (e.g., IAB node 16*a*):

a) Transmitting a power control request to a second network node 16 (e.g., parent IAB node 16*b*);
b) Receiving a power control response from the second network node 16;
c) Performing at least one action towards a third node 16, 22 (child IAB node 16*c* or WD 22), based on the power control response from the second network node 16. In some embodiments, which action to take may be based on the response. In some embodiments, the at least one action may include one or more of initializing communications with the third node 16, 22; scheduling communications with the third node 16, 22; and/or transmitting signaling to the third node 16, 22 to, e.g., set or adjust: transmit power, resource allocation, multiplexing scheme, MCS, precoder weights, beam direction and/or the IAB node's availability to the third node 16, 22.

In some embodiments of any of the above arrangements and/or methods, the response may be that the request is acknowledged (ACK) or not acknowledged (NACK).

In some embodiments of any of the above arrangements and/or methods, the response includes a value of the power control change.

In some embodiments of any of the above arrangements and/or methods, the action is to communicate with the third node 16, 22 and, depending on if the response was an ACK or a NACK, modify at least one of the following parameters (e.g., the communication may be, for example, to signal an indication of the modification taken and/or another signaling in order to implement the modification):

d) Scheduling MCS of third node 16, 22;
e) Transmit power of third node 16, 22;
f) Resource allocation of communication between the IAB node 16*a* and the third node 16, 22 (e.g., may include both time and frequency resource allocation, or only a time or frequency resource allocation);
g) Precoder weights of the IAB node 16*a;*
h) Determining a multiplexing scheme (frequency division multiplexing/FDM, space division multiplexing/SDM, time division multiplexing/TDM, etc.); and/or
i) Availability indicator to the third node 16, 22.

Some Examples

Example A1. A network node 16 configured to communicate with a wireless device 22 (WD 22), the network node 16 configured to, and/or comprising a radio interface 62 and/or comprising processing circuitry 68 configured to:
- transmit a power control request to a second network node 16;
- receive a power control response from the second network node 16; and
- perform at least one action towards a third node 16, 22 based at least in part on the power control response.

Example A2. The network node 16 of Example A1, wherein the network node 16 is an Integrated Access Backhaul (IAB) node 16; the second network node 16 is a parent IAB node of the network node 16; and the third node 16, 22 is one of the WD 22 and a child IAB node 16 of the network node 16.

Example A3. The network node 16 of any one of Examples A1 and A2, wherein one of more of:
- the power control response comprises one of an acknowledged (ACK) and a negative acknowledgement (NACK) to the power control request;
- the power control response includes a value of a power control change;
- the at least one action comprises communicating with the third node 16, 22 and based on whether the response is an ACK or a NACK, modify at least one parameter for the third node 16, 22;
- the at least one parameter includes at least one of: scheduling modulation and coding scheme (MCS) of the third node 16, 22; transmit power of third node 16, 22; resource allocation of communication between the network node 16 and the third node 16, 22; precoder weights of the IAB node 16; a multiplexing scheme; and/or an availability indicator;
- the power control request is based at least in part on a power control capability report from the second network node 16;
- the report includes a dynamic range of a power control of the second network node 16;
- the power control request is based at least in part on a determination of a scheduling restriction associated with the second network node 16; and the power control request indicates a target power value or a power change value.

Example B1. A method implemented in a network node 16, the method comprising:

transmitting a power control request to a second network node 16;

receiving a power control response from the second network node 16; and performing at least one action towards a third node 16, 22 based at least in part on the power control response.

Example B2. The method of Example B1, wherein the network node 16 is an Integrated Access Backhaul (IAB) node 16; the second network node 16 is a parent IAB node 16 of the network node 16; and the third node 16, 22 is one of the WD 22 and a child IAB node 16 of the network node 16.

Example B3. The method of any one of Examples B1 and B2, wherein one of more of:

the power control response comprises one of an acknowledged (ACK) and a negative acknowledgement (NACK) to the power control request;

the power control response includes a value of a power control change;

the at least one action comprises communicating with the third node 16, 22 and based on whether the response is an ACK or a NACK, modify at least one parameter for the third node 16, 22;

the at least one parameter includes at least one of: scheduling modulation and coding scheme (MCS) of the third node 16, 22; transmit power of third node; resource allocation of communication between the network node 16 and the third node 16, 22; precoder weights of the IAB node 16; a multiplexing scheme; and/or an availability indicator;

the power control request is based at least in part on a power control capability report from the second network node 16;

the report includes a dynamic range of a power control of the second network node 16;

the power control request is based at least in part on a determination of a scheduling restriction associated with the second network node 16; and the power control request indicates a target power value or a power change value.

Example C1. A network node 16 configured to communicate with a wireless device 22 (WD 22), the network node 16 configured to, and/or comprising a radio interface 62 and/or comprising processing circuitry 68 configured to:

receive a power control request from a second network node 16; and transmit a power control response to the second network node 16.

Example C2. The network node 16 of Example C1, wherein the network node 16 is a parent Integrated Access Backhaul (IAB) node 16 of the second network node 16 and the second network node 16 is a child IAB node 16 of the network node 16.

Example C3. The network node 16 of any one of Examples C1 and C2, wherein one of more of:

the power control response comprises one of an acknowledged (ACK) and a negative acknowledgement (NACK) to the power control request;

the power control response includes a value of a power control change;

the power control request is based at least in part on a power control capability report sent by the network node 16 to the second network node 16 prior to receipt of the power control request;

the report includes a dynamic range of a power control of the network node 16;

the power control request is based at least in part on a determination of a scheduling restriction associated with the network node 16; and the power control request indicates a target power value or a power change value.

Example D1. A method implemented in a network node 16, the method comprising:

receiving a power control request from a second network node 16; and transmitting a power control response to the second network node 16.

Example D2. The method of Example D1, wherein the network node 16 is a parent Integrated Access Backhaul (IAB) node 16 of the second network node 16 and the second network node 16 is a child IAB node 16 of the network node 16.

Example D3. The method any one of Examples D1 and D2, wherein one of more of:

the power control response comprises one of an acknowledged (ACK) and a negative acknowledgement (NACK) to the power control request;

the power control response includes a value of a power control change;

the power control request is based at least in part on a power control capability report sent by the network node 16 to the second network node 16 prior to receipt of the power control request;

the report includes a dynamic range of a power control of the network node 16;

the power control request is based at least in part on a determination of a scheduling restriction associated with the network node 16; and the power control request indicates a target power value or a power change value.

In some embodiments of any of the above arrangements and/or methods, prior to transmitting the power control request, receiving a power control capability report from the second network node through, e.g., OAM or dedicated RRC signaling.

In some embodiments of any of the above arrangements and/or methods, the report includes a dynamic range of the power control of second network node 16. In some embodiments of any of the above arrangements and/or methods, the range further includes a value of an incremental step. In some embodiments of any of the above arrangements and/or methods, prior to sending the power control request, the IAB node **16*a* has determined a scheduling restriction being present. In some embodiments of any of the above arrangements and/or methods, the power control request includes a target power value or a power change value. In some embodiments of any of the above arrangements and/or methods, the power control message represents a specific time and/or frequency resource. In some embodiments of any of the above arrangements and/or methods, the power control response is received occasionally or once every Nth power control request, prior to which the IAB node 16*a* assumes the power control reply (or assumes the power control in a most recent previous power control response). In some embodiments of any of the above arrangements and/or methods, upon receiving a NACK, the IAB node 16*a*** reverts all assumed power control responses included in or otherwise associated with the NACK message.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A first node comprising:

processing circuitry configured to:

transmit a power control request to a parent, integrated access and backhaul, IAB, node, the power control request configured to request an adjustment of a transmission power of the parent IAB node;

receive a power control response from the parent IAB node; and perform at least one action associated with a second node based at least in part on the power control response, the at least one action comprising:

at least temporarily pausing a scheduling for a wireless device that is outside of a distance threshold; and scheduling a wireless device that is within the distance threshold.

2. A method implemented by a first node, the method comprising:

transmitting a power control request to a parent, integrated access and backhaul, IAB, node, the power control request configured to request an adjustment of a transmission power of the parent IAB node;

receiving a power control response from the parent IAB node; and performing at least one action associated with a second node based at least in part on the power control response, the at least one action comprising:

at least temporarily pausing a scheduling for a wireless device that is outside of a distance threshold; and scheduling a wireless device that is within the distance threshold.

3. The method of claim 2, wherein the at least one action includes scheduling the second node simultaneously with a scheduling of the first node.

4. The method of claim 3, wherein the power control response is an acknowledgment that indicates the transmission power of the parent IAB node is being adjusted.

5. The method of claim 2, wherein the at least one action includes adjusting at least one parameter of transmission of the second node.

6. The method of claim 5, wherein the adjusting of the at least one parameter of transmission of the second node includes at least one of:

adjusting an uplink scheduling modulation and coding scheme, MCS, of the second node;

adjusting a transmit power of the second node;

adjusting a resource allocation assigned to the second node; and setting a multiplexing scheme of the second node with respect to resources allocated to the first node by the parent IAB node.

7. The method of claim 2, wherein the at least one action includes adjusting at least one parameter of transmission of the first node.

8. The method of claim 7, wherein the adjusting of the at least one parameter of transmission of the first node includes at least one of:

adjusting precoder weights of the first node to downscale a required dynamic range of the parent IAB node;

adjusting a beam direction to avoid receiving a maximum transmission power from the parent IAB node; and adjusting an availability indicator to the second node.

9. The method of claim 5, wherein the power control response is a negative acknowledgment that indicates the transmission power of the parent IAB node is not being adjusted.

10. The method of claim 2, wherein the second node is one of a child IAB node and wireless device.

11. The method of claim 2, wherein the first node is one of an IAB node and wireless device.

12. A parent, integrated access and backhaul, IAB, node comprising:

processing circuitry configured to:

receive a power control request from a first node, the power control request is configured to request an adjustment of a transmission power of the parent IAB node; and cause transmission of a power control response to the first node, the power control response being a negative acknowledgment that indicates the transmission power of the parent IAB node is not being adjusted.

13. A method implemented by a parent, integrated access and backhaul, IAB, node, the method comprising:

receiving a power control request from a first node, the power control request is configured to request an adjustment of a transmission power of the parent IAB node; and causing transmission of a power control response to the first node, the power control response being a negative acknowledgment that indicates the transmission power of the parent IAB node is not being adjusted.

14. The method of claim 13, wherein the power control response is configured to at least in part cause the first node to perform at least one action associated with a second node.

15. The method of claim 14, wherein the at least one action includes scheduling the second node simultaneously with a scheduling of the first node.

16. The method of claim 15, wherein the power control response is an acknowledgment that indicates the transmission power of the parent IAB node is being adjusted.

17. The method of claim 14, wherein the at least one action includes adjusting at least one parameter of transmission of the second node.

18. The method of claim 17, wherein the adjusting of the at least one parameter of transmission of the second node includes at least one of:

adjusting an uplink scheduling modulation and coding scheme, MCS, of the second node;

adjusting a transmit power of the second node;

adjusting a resource allocation assigned to the second node; and setting a multiplexing scheme of the second node with respect to resources allocated to the first node by the parent IAB node.

19. The method of claim 14, wherein the at least one action includes adjusting at least one parameter of transmission of the first node.

* * * * *